US012724691B2

(12) United States Patent
Baker et al.

(10) Patent No.: US 12,724,691 B2
(45) Date of Patent: Sep. 1, 2026

(54) AUTOMATED SOFTWARE TESTING USING NATURAL LANGUAGE-BASED FORM COMPLETION

(71) Applicant: Microsoft Technology Licensing, LLC, Redmond, WA (US)

(72) Inventors: William Tigard Baker, Redmond, WA (US); Swamy V. P. L. N. Nallamalli, Bothell, WA (US); Dallas Allen Warren, Redmond, WA (US); Piyush Gupta, Sammamish, WA (US); Aaron Edward Dietrich, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 18/214,613

(22) Filed: Jun. 27, 2023

(65) Prior Publication Data

US 2025/0004910 A1 Jan. 2, 2025

(51) Int. Cl.

| | |
|---|---|
| ***G06F 11/3604*** | (2025.01) |
| ***G06F 11/3668*** | (2025.01) |
| ***G06F 16/334*** | (2025.01) |

(52) U.S. Cl.
CPC ...... *G06F 11/3612* (2013.01); *G06F 11/3668* (2013.01); *G06F 16/3344* (2019.01)

(58) Field of Classification Search
None
See application file for complete search history.

(56) References Cited

U.S. PATENT DOCUMENTS

| | | | | |
|---|---|---|---|---|
| 10,164,848 | B1 * | 12/2018 | Chen | G06F 11/3684 |
| 10,747,651 | B1 * | 8/2020 | Vanderwall | G06F 11/3684 |
| 11,010,284 | B1 * | 5/2021 | Santiago | G06N 20/00 |
| 11,113,175 | B1 * | 9/2021 | Adamo | G06F 40/216 |
| 12,596,535 | B2 | 4/2026 | Ciminelli et al. | |
| 2005/0086643 | A1 * | 4/2005 | Shane | G06F 11/36 717/124 |
| 2008/0086627 | A1 | 4/2008 | Splaine et al. | |
| 2011/0276944 | A1 | 11/2011 | Bergman et al. | |
| 2013/0268260 | A1 | 10/2013 | Lundberg et al. | |

(Continued)

OTHER PUBLICATIONS

Zhe Liu et al., "Fill in the Blank: Context-aware Automated Text Input Generation for Mobile GUI Testing," arXiv:2212.04732v1 [cs.SE], Dec. 9, 2022, doi: 10.48550/arXiv.2212.04732 (Year: 2022).*

(Continued)

*Primary Examiner* — Andrew M. Lyons
(74) *Attorney, Agent, or Firm* — Cantor Colburn LLP; Jessica M Meyers

(57) ABSTRACT

Aspects of the disclosure include methods and systems for performing automated software testing. The method can include executing software under test and determining that the user interface of the software includes a textual input field. The method includes identifying a label of the textual input field, inputting into a natural language processing system the label as a query and receiving, from the natural language processing system in response to the query, a first input text. The method also includes inputting the first input text into the textual input field and recording a first response of the software to the first input text.

17 Claims, 12 Drawing Sheets

(56) References Cited

U.S. PATENT DOCUMENTS

| | | | | |
|---|---|---|---|---|
| 2015/0095721 | A1* | 4/2015 | Beskrovny | G06F 16/9577 714/48 |
| 2015/0370688 | A1 | 12/2015 | Zhang et al. | |
| 2016/0132421 | A1 | 5/2016 | Cobb, Jr. et al. | |
| 2016/0179658 | A1 | 6/2016 | Avery et al. | |
| 2018/0189170 | A1 | 7/2018 | Dwarakanath et al. | |
| 2018/0267887 | A1 | 9/2018 | Dsouza | |
| 2019/0087398 | A1* | 3/2019 | Kolesov | G06F 40/174 |
| 2020/0019488 | A1 | 1/2020 | Singh et al. | |
| 2020/0065218 | A1 | 2/2020 | Bhosale et al. | |
| 2021/0081294 | A1 | 3/2021 | Golubev | |
| 2022/0091968 | A1* | 3/2022 | Kumar | G06F 11/3698 |
| 2022/0138088 | A1 | 5/2022 | Shang et al. | |
| 2022/0277143 | A1 | 9/2022 | Jayarao et al. | |
| 2022/0413997 | A1 | 12/2022 | Shi et al. | |
| 2023/0237826 | A1* | 7/2023 | Perez | G06N 3/0475 |
| 2024/0281600 | A1 | 8/2024 | Brown et al. | |
| 2024/0303184 | A1 | 9/2024 | Liu et al. | |
| 2025/0004928 | A1 | 1/2025 | Baker et al. | |

OTHER PUBLICATIONS

D. Santiago, J. Phillips, P. Alt, B. Muras, T. M. King and P. J. Clarke, "Machine Learning and Constraint Solving for Automated Form Testing," 2019 IEEE 30th International Symposium on Software Reliability Engineering (ISSRE), Berlin, Germany, 2019, pp. 217-227. (Year: 2019).*

International Search Report and Written Opinion received for PCT Application No. PCTPCT/US2024/035684, Nov. 29, 2024, 24 pages.

Invitation to Pay Additional Fees received for PCT Application No. PCT/US2024/035684, Oct. 7, 2024, 13 pages.

Zimmermann, et al., "Automating GUI-based Software Testing with GPT-3", IEEE International Conference on Software Testing, Verification and Validation Workshops (ICSTW), Apr. 16, 2023, pp. 62-65.

International Search Report and Written Opinion received for PCT Application No. PCT/US2024/034225, Nov. 13, 2024, 17 pages.

Yue et al., "RTCM: a national language based, automated, and practical test case generation framework." Proceedings of the 2015 international symposium on software testing and analysis. (Year:2015); pp. 397-408.

Non-Final Office Action mailed on Dec. 5, 2024, in U.S. Appl. No. 18/214,616, 24 pages.

Final Office Action mailed on Jul. 1, 2025, in U.S. Appl. No. 18/214,616, 28 pages.

Liu et al., "CrawLabel: computing natural-language labels for UI test cases." Proceedings of the 3rd ACM/IEEE International Conference on Automation of Software Test, May 17, 2022, pp. 103-114.

Moreira, et al., "A pattern-based approach for GUI modeling and testing", IEEE 24th International Symposium on Software Reliability Engineering (ISSRE), Nov. 2013, 10 pages.

Non-Final Office Action mailed on Oct. 1, 2025, in U.S. Appl. No. 18/214,616, 28 pages.

Final Office Action mailed on Jan. 9, 2026, in U.S. Appl. No. 18/214,616, 31 pages.

International Preliminary Report on Patentability (Chapter I) received for PCT Application No. PCT/US2024/035684, Jan. 8, 2026, 16 pages.

Khaliq, et al., "A deep learning-based automated framework for functional User Interface testing." In Journal of Information and Software Technology, vol. 150, Jun. 7, 2022, 13 Pages.

International Preliminary Report on Patentability (Chapter I) received for PCT Application No. PCT/US2024/034225, Mailed on Jan. 8, 2026, 12 Pages.

Chen, et al., "Improving crowd-supported gui testing with structural guidance", In Proceedings of the 2020 CHI Conference onhuman factors in computing systems, Apr. 2020, 13 Pages.

Non-Final Office Action mailed on May 20, 2026, in U.S. Appl. No. 18/214,616, 32 pages.

* cited by examiner

700

702

| SUT ID (704) | Input Field Label (706) | Accepted Input text (708) |
| --- | --- | --- |
| 0001 | Name | John Doe |
| 0001 | Phone | 12125553151 |
| 0001 | Credit Card Number | 1111-2222-3333-4444 |
| 0002 | Variable Name | Variable A |
| 0002 | Label | TestLabel |

FIG. 7

AUTOMATED SOFTWARE TESTING USING NATURAL LANGUAGE-BASED FORM COMPLETION

INTRODUCTION

The subject disclosure relates to software testing, and particularly to automated software testing using natural language-based form completion.

Testing software prior to its release is often performed to ensure the quality and reliability of the software. Proper testing helps identify bugs, errors, and usability issues, allowing developers to fix them before the software reaches users. Traditionally, testing of new software was a manual task that that required software developers to spend significant resources to ensure proper operation of the software. Attempts to reduce the time and resources required for testing new software products led to the use of test scripts to test software. Test scripts are written in a programming or scripting language and are used to automate the execution of test cases.

Automated testing with test scripts can significantly improve the efficiency of the software testing process. Scripts can execute tests much faster than manual testing, allowing for quicker feedback on the software's quality and reducing the time required for testing. In addition, test scripts ensure that the same set of tests are executed consistently, eliminating human errors and variations in test execution.

While test scripts can greatly enhance the efficiency and effectiveness of software testing, test scripts require substantial effort to develop and maintain and certain aspects of testing still require manual intervention. For example, testing of a software product that includes a user interface with textual input fields often requires manual intervention because the textual input fields often have specific rules that may not be properly programmed into the testing script. As a result, the testing scripts often fail to populate textual input fields with valid values.

SUMMARY

Embodiments of the present disclosure are directed to methods for automated testing of software under test. An example method includes executing software under test and determining that a user interface of the software under test includes a textual input field. The method also includes identifying a label of the textual input field, inputting into a natural language processing system the label as a query, and receiving, from the natural language processing system in response to the query, a first input text. The method also includes inputting the first input text into the textual input field and recording a first response of the software under test to the first input text.

Embodiments of the present disclosure are directed to methods for automated testing of software under test. An example method includes executing software under test and determining that the user interface of the software under test includes a textual input field. The method also includes identifying a label of the textual input field, obtaining a first input text from a textual input database based on the label, and inputting the first input text into the textual input field. The method further includes determining that a first response of the software under test to the first input text includes a first error message related to the textual input field, inputting into a natural language processing system the label and the first error message as a query, and receiving, from the natural language processing system in response to the query a second input text. The method also includes inputting the second input text into the textual input field and recording a second response of the software under test to the second input text.

Embodiments of the present disclosure are directed to a system having a memory, computer readable instructions, and a processing system for executing the computer readable instructions. The computer readable instructions control the processing system to perform operations that include executing software under test, determining that user interface of the software under test includes a textual input field, and identifying a label of the textual input field. The operations also include inputting into a natural language processing system the label as a first query, receiving, from the natural language processing system in response to the first query, a first input text, and inputting the first input text into the textual input field. The operations also include determining that a first response of the software under test includes a first error message related to the textual input field, inputting into the natural language processing system the label and the first error message as a second query, and receiving, from the natural language processing system in response to the second query, a second input text. The operations further include inputting the second input text into the textual input field and recording a second response of the software under test to the second input text.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

FIG. 7 depicts an example of a textual input database in accordance with one or more embodiments;

Figure 1:
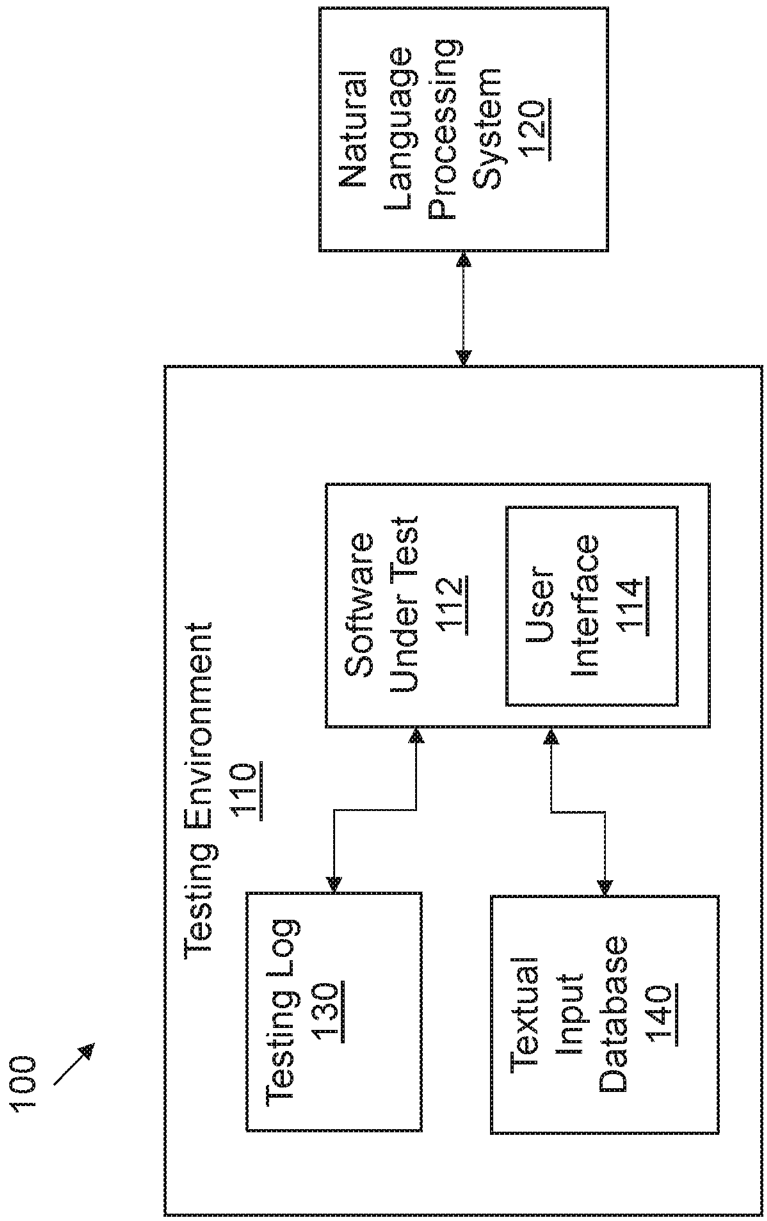
FIG. 1 depicts a block diagram of an example system for automated testing of software under test in accordance with one or more embodiments.

The diagrams depicted herein are illustrative. There can be many variations to the diagrams or the operations described therein without departing from the spirit of the disclosure. For instance, the actions can be performed in a differing order or actions can be added, deleted, or modified.

In the accompanying figures and following detailed description of the described embodiments of the disclosure, the various elements illustrated in the figures are provided with two or three-digit reference numbers. With minor exceptions, the leftmost digit(s) of each reference number corresponds to the figure in which its element is first illustrated.

DETAILED DESCRIPTION

As discussed above, while test scripts can improve the efficiency and effectiveness of software testing, certain aspects of software testing still require manual intervention. One common area of software testing that often requires manual intervention is the testing of a software product that includes a user interface with textual input fields. In many cases, these textual input fields have specific input rules that may not be properly programmed into the testing script. For example, the textual input field may include restrictions on a length of a textual input, the characters used in the textual input, and the format of the textual input. During testing, when a textual input is provided that does not comply with the specific input rules, an error occurs that often requires manual intervention to address. This manual intervention increases the time required to complete the testing of the software. In addition, since software evolves over time, manually developed test scripts become stale and unable to properly test the software. As a result, test scripts need to be updated frequently to account for changes in the software. This manual frequent updating of test scripts is both time consuming and error prone.

This disclosure involves the use of natural language processing systems, such as large language models, to generate an input text for testing software that includes a user interface with textual input fields. Aspects of the present disclosure include identifying textual input fields of the software under test and identifying a label of each of the textual input fields. The labels of the textual input fields are provided to a natural language processing system and an input text is obtained from the response received from the natural language processing system.

In various embodiments, depending on the type of natural language processing system used, the labels of the textual input fields may be provided to the natural language processing system as one of a query, a prompt, or in another structured format. The term query used herein is intended to generally refer to any structured input that is provided to the natural language processing system to obtain the input text from the natural language processing system.

Aspects of the present disclosure also include detecting the response of the software under test to the input text. In one embodiment, a response of the software under test includes an error message related to the textual input field. In one embodiment, based on determining that the response includes an error message related to the textual input field, an updated query including the label and information about the error message is provided to the natural language processing system. In one embodiment, the information about the error message includes text extracted from the error message. An updated input text is obtained from the response received from the natural language processing system and input into the textual input field.

In one embodiment, the process of querying the natural language processing system with error messages provided by the software under test relating to the textual input field is repeated until the input text is accepted by the software under test, a predefined number of input texts have been attempted, or consecutive identical error messages are received.

Advantageously, automated software testing tools that utilize natural language processing systems for user interface form completion increase the robustness of the software testing tools by using the natural language processing system to automatically generate textual input rather than relying on user provided textual input. Moreover, providing automated software testing that leverages natural language processing systems for user interface form completion reduces the amount of time required for testing software products by eliminating the need for users to generate a testing script that includes text input for each textual input field of the user interface. Automatically generating input text using natural language processing systems improves the computational efficiency of the software testing system by reducing errors that may be generated by the software testing system. In addition, automated software testing that uses natural language processing systems for user interface form completion allows testing to be performed more rapidly than traditional testing software by reducing the input needed from a user during testing.

In some embodiments, a textual input database is maintained that stores labels of textual input fields and previously accepted input text for the textual input fields. The textual input database is updated each time an input text is accepted by the software under test. One technical benefit of utilizing the textual input database in addition to the natural language processing system for user interface form completion is that the time for receiving a response from the textual input database may be substantially shorter than the time required to receive a response from the natural language processing system. As a result, the speed of testing the software under test can be increased while still realizing the benefits of the natural language processing system.

Referring now to FIG. 1, a block diagram of a system 100 for automated testing of the software under test in accordance with one or more embodiments is shown. As illustrated, the system 100 includes a testing environment 110 having the software under test 112, a testing log 130, and a textual input database 140. The system 100 also includes a natural language processing system 120. Although illustrated as discrete items, the testing environment 110 and the natural language processing system 120 may be embodied in a single computing system, such as the one shown in FIG. 11. Alternatively, the testing environment 110 and the natural language processing system 120 may be embodied in separate computing systems, such as the one shown in FIG. 11.

In one embodiment, the testing environment 110 is a computing system that includes a configuration of hardware, software, and network resources required to perform software testing activities of the software under test 112, which includes a user interface 114. The testing environment 110 includes monitoring and logging mechanisms that capture relevant metrics, errors, and performance data during testing and store these metrics in the testing log 130. The testing log 130 is used to analyze the behavior of the software under test 112, diagnose issues of the software under test 112, and gather insights for further improvements to the software under test 112. In one embodiment, the textual input database 140 stores labels of textual input fields and previously accepted input text for the textual input fields. The textual input database 140 is updated each time an input text may be accepted by the software under test.

In one embodiment, the natural language processing system 120 is a computing system that receives the label of textual input field from the testing environment and generates an input text. In general, natural language processing systems are computer-based technologies that aim to enable computers to understand, interpret, and generate human language. These systems utilize various computational techniques and algorithms to process and analyze textual data in order to extract meaning, understand context, and perform tasks related to language understanding and generation. Natural language processing systems encompass a wide range of subfields and techniques, including information retrieval, text classification, sentiment analysis, machine translation, question answering, and more. These systems often employ statistical models, machine learning algorithms, and linguistic rules to process and analyze text, enabling them to perform tasks like information extraction, sentiment analysis, document classification, and language translation.

The natural language processing system 120 may employ a combination of techniques from various fields, including linguistics, computer science, artificial intelligence, and machine learning. The natural language processing system 120 can include an information retrieval system, a question answering system, and/or a text generation system. Such natural language processing systems can include PyTorch-NLP, OpenNLP, and StanfordNLP.

In one embodiment, the natural language processing system 120 includes a large language model, which is an artificial intelligence model that has been trained on vast amounts of textual data to understand and generate human-like language. Such large language models can include GPT-2, GPT-3, and GPT-4 by OpenAI, Guanaco, OpenLLaMa, and StableLM. In this embodiment, the large language model is provided with an input that includes a request to provide an example textual input for textual input field based on the label of the textual input field. In response to the input, the large language model generates a response that includes a textual input. For example, when provided with an input of "First Name" the large language mode may provide a response such as "Jane" or "John" that can be input into the textual input field.

In one embodiment, the natural language processing system 120 is a machine learning model that has been trained to provide an input text based on an input of a label of a textual input field. The natural language processing system is created by first obtaining training data, which may be structured or unstructured data. According to one or more embodiments described herein, the training data includes textual input that corresponds to a label of a textual input field. Once the training data is obtained, a training module receives the training data and an untrained model. The untrained model can have preset weights and biases, which can be adjusted during training. The training can be supervised learning, semi-supervised learning, unsupervised learning, reinforcement learning, and/or the like, including combinations and/or multiples thereof. The training may be performed multiple times (referred to as "epochs") until a suitable model is trained. Once trained, the trained model is configured to provide an input text based on an input of a label of a textual input field by applying the trained model to new data. (e.g., real-world, non-training data).

Figure 2A:
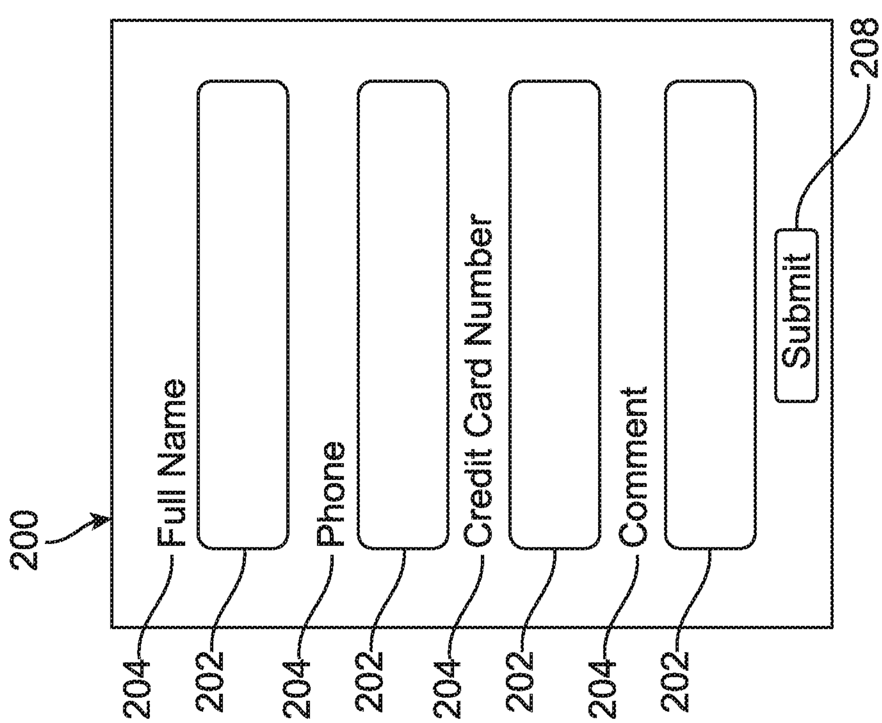
FIGS. 2A and 2B depict examples of user interfaces of software under test in accordance with one or more embodiments.
Figure 2B:
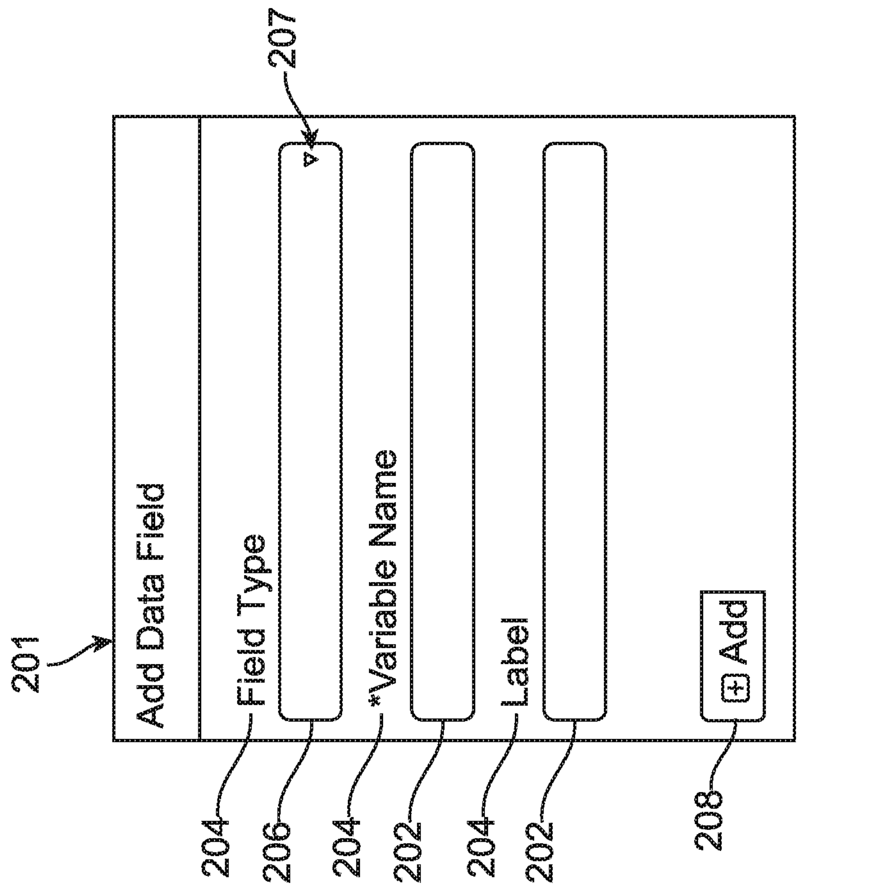

Referring now to FIGS. 2A and 2B examples of user interfaces 200, 201 of software under test in accordance with one or more embodiments are shown. As illustrated, user interfaces 200, 201 include textual input fields 202 that each have a label 204 associated with the textual input fields 202. In one embodiment, the user interfaces 200, 201 may also include additional information that is associated with the textual input fields 202. For example, such additional information may include hover-over text that is displayed when a cursor is over the textual input field 202, metadata associated with the textual input field 202, listed examples for the textual input field 202, parameters provided for the textual input field 202, and the like.

The user interface 201 also includes a drop-down input field 206 indicated by icon 207. The user interfaces 200, 201 each include a user interface element 208 that is provided for the user to indicate that an input has been provided for each textual input field 202 and that an input has been selected for each drop-down input field 206. In one embodiment, a testing environment performing a test of the software is configured to identify each textual input field 202 and the label 204 associated with the textual input field 202 of the user interface 200, 201 of the software under test.

Figure 3B:
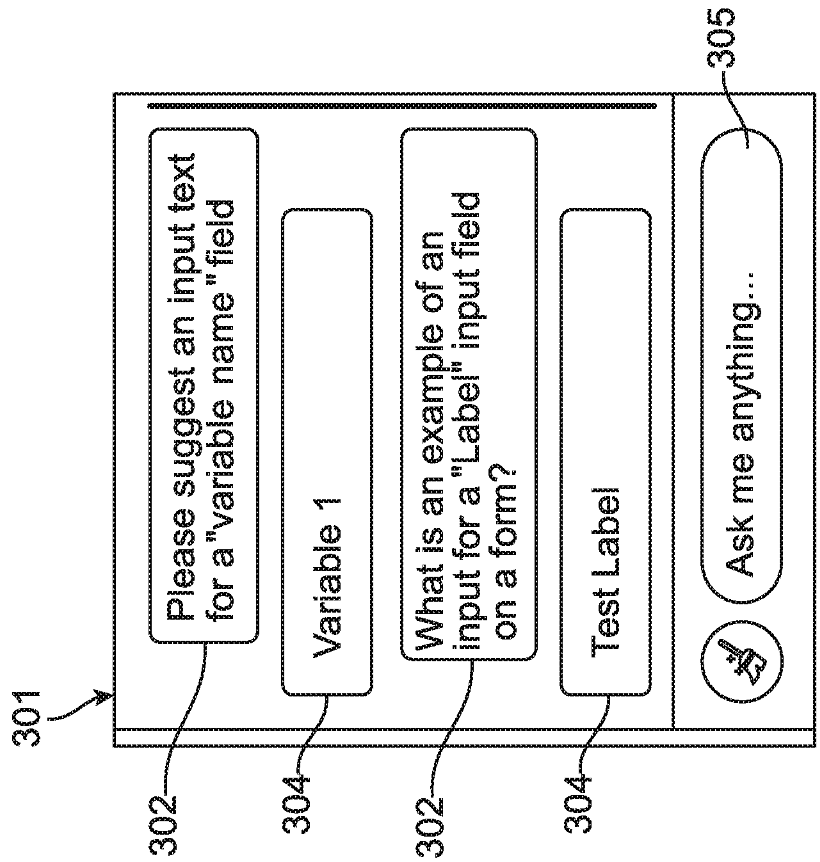
FIGS. 3A and 3B depict examples of a query and response of a natural language processing system for generating input text in accordance with one or more embodiments.
Figure 3A:
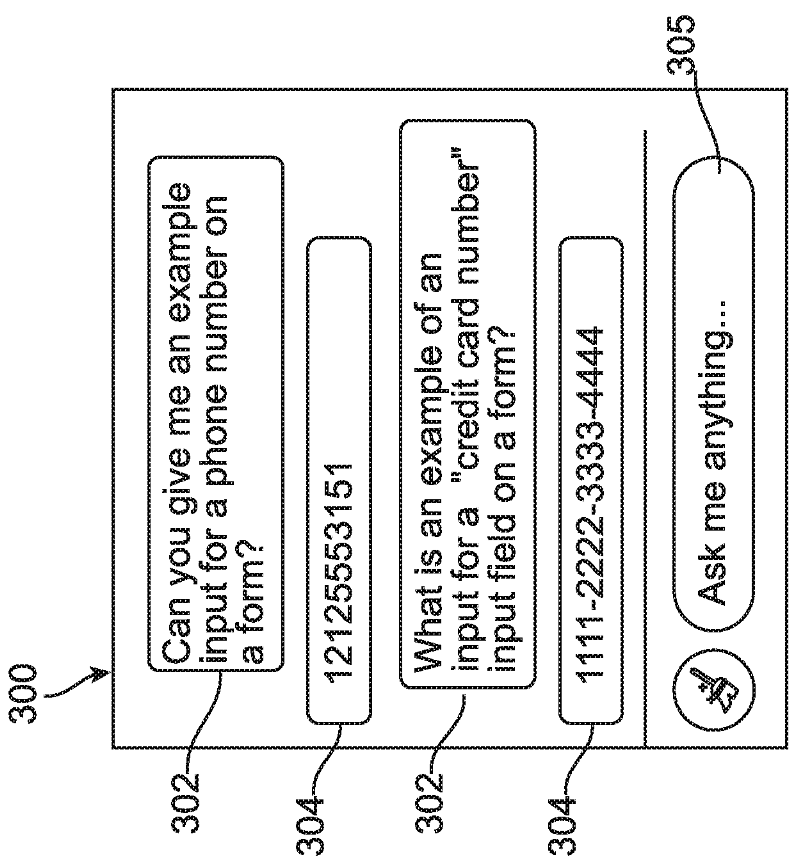

Referring now to FIGS. 3A and 3B examples of a query and response of a natural language processing system 300, 301 for generating input text in accordance with one or more embodiments are shown. Although the interaction with the natural language processing system is depicted as using a graphical user interface, the interaction with the natural language processing system may also be performed using an application programming interface (API) of the natural language processing system.

The query and response of the natural language processing system 300 correspond to the user interface 200 depicted in FIG. 2A and the query and response of the natural language processing system 301 corresponds to the user interface 201 depicted in FIG. 2B. In one embodiment, the natural language processing systems 300, 301 each include an input field 305 that is used to submit a query 302. In one embodiment, queries 302 including the labels 204 of one or more textual input fields 202 are provided to natural language processing systems 300, 301. In a further embodiment, the query also includes additional information that is associated with the textual input fields 202. For example, such additional information may include hover-over text that is displayed when a cursor is over the textual input field, metadata associated with the textual input field, listed examples for the textual input field, parameters provided for the textual input field, and the like.

In one embodiment, the testing interface is configured to analyze the user interface and to identify each of the textual input fields, the labels associated with the textual input fields, and any additional information that is associated with the textual input fields 202. The testing environment 110 can identify textual input fields 202 on a graphical user interface based on detecting visual cues or inspecting underlying code, such as hypertext markup language (HTML) code. In one embodiment, the testing environment 110 uses open source software, such as Open Source Computer Vision Library (OpenCV), PyAutoGUI, or the like, to identify textual input fields using image processing techniques, such as contour detection, edge detection, and template matching. In one embodiment, the testing environment can identify areas on the user interface that resemble input fields based on labels that indicate an expected input or based on a cursor or a blinking caret that can be used to indicate a textual input field. In one embodiment, the testing environment inspects the underlying code of the user interface to identify input fields. For example, in HTML, input fields are often represented by the <input> tag or other related tags such as <textarea>. These tags usually have attributes like type="text" or type="password" to specify the input field type.

In one embodiment, the testing environment creates queries in the form of questions that are provided to the natural language processing system. The testing environment includes one or more forms that are used to create the queries. For example, the query may be structured as "Provide a sample input for a textual input field having a label [label 204]?" In another embodiment, the query generated by the testing environment only includes the labels 204 of the textual input fields 202. For example, the query may only include "[label 204]". The natural language processing systems 300, 301 generates a response to each query 302. The generated response includes an input text 304.

Figure 4:
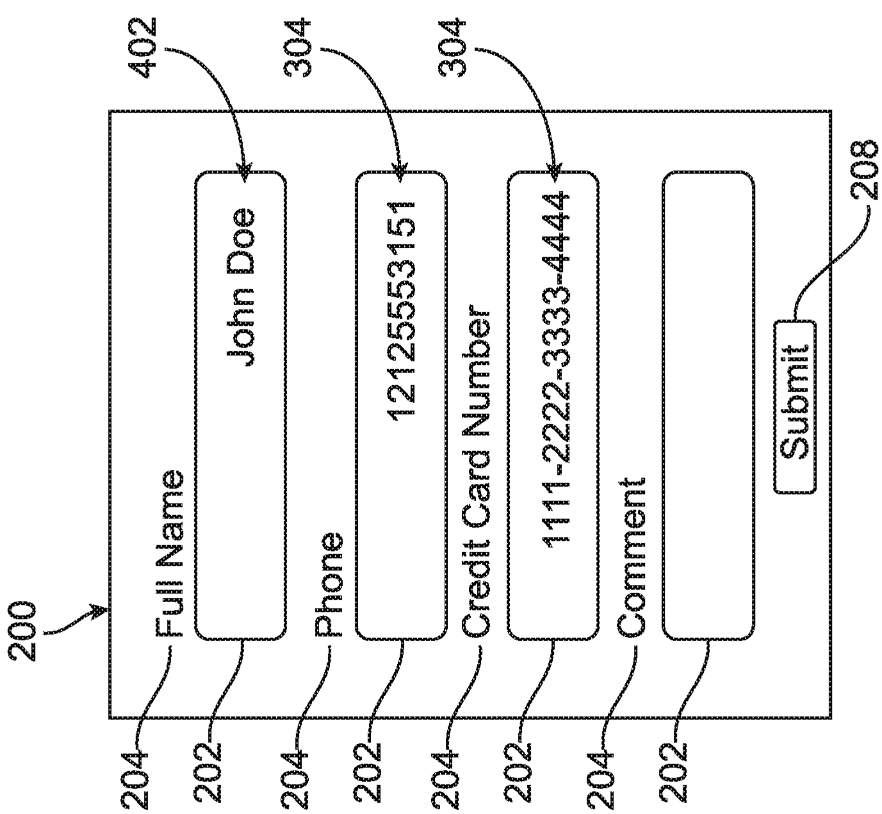
FIG. 4 depicts an example of a user interface of software under test including input text received from a natural language processing system in accordance with one or more embodiments.

Referring now to FIG. 4, an example of a user interface 200 of the software under test including input text 304 received from a natural language processing system 300, shown in FIG. 3A, in accordance with one or more embodiments, is shown. As illustrated, the input text 304 received from a natural language processing system 300 is input to the corresponding textual input fields 202. For example, as shown in FIG. 3A, the input text 304 received from the natural language processing system corresponding to each label 402 is input into the textual input field 202 associated with the label 402. In one example, the testing environment receives the input text 304 from the output of the natural language processing system and provides the input text 304 into the corresponding textual input field 202. In one example, the testing environment provides the query to the natural language processing system 300 via an API call and receives an API call response that includes the input text 304, which the testing environment inputs into the corresponding textual input field 202 of the software.

In one embodiment, an input text 402, which is obtained from a textual input database, is input into the corresponding textual input field 202. In one example, before utilizing a natural language processing system to obtain an input text an input database may be used to attempt to obtain an input text. For example, the input database is queried with the label 402 of a textual input field 202 and the response provided by the input database is input into the textual input field 202 associated with the label 402. In one example, the input text 304 is copied from the output of the input database and pasted into the corresponding textual input field 202. In one embodiment, if the input database does not produce a response to the query, a natural language processing system to obtain an input text.

In one embodiment, once the textual input fields 202 have been completed, the testing environment selects the user interface element 208 and the user interface form is submitted. For example, once a textual input has been provided for each of the textual input fields, a user interface element 208, such as the submit or add buttons is selected by the testing environment. In some embodiments, the user interface element 208 may only be available for selection once a textual input has been provided for each of the textual input fields 202. For example, when one or more of the textual input fields 202 has not been completed the user interface element 208 may be inactive, such that the testing environment cannot select the user interface element 208. Once the user interface element 208 is selected, and the user interface for is submitted, the response of the software is recorded in a testing log, such as the testing log 130 shown in FIG. 1. The recorded response can include, the input text provided for each textual input field, an indication of whether the text was accepted or whether an error message was provided regarding the input text, and information regarding the error message.

In an embodiment where no error messages are detected on the user interface 200, the input text 304 and the labels 204 associated with the corresponding textual input fields 202 are added to a textual input database. In one embodiment, the testing environment performs a comparison of the user interface 200 from before selecting the user interface element 208 and after selecting the user interface element to detect the presence of error messages. For example, the testing environment may capture an image of the user interface 200 before selecting the user interface element 208 and after selecting the user interface element and calculate a similarity between the two images. In one embodiment, the testing environment uses one of several open source programs such as ImageMagick, OpenCV, DSSIM, ImageHash, and PerceptualDiff to compare the images of the user interface 200. These programs compare the images, highlight differences between the images, and calculate a similarity score for the images. In general, these programs use image processing techniques, such as contour detection, edge detection, and template matching, to identify and locate input fields in a user interface.

Based on the determination that the user interface has not changed (e.g., that the similarity is above a first threshold level) and that the user interface has is not identical (e.g., that the similarity is less than one hundred percent), the testing environment detects the changed portions of the user interface. The locations of the changed portions of the user interface are compared with the locations of the textual input fields and changed portions that are proximate to the textual input fields are determined to be error messages relating to the textual input fields. The testing environment uses this comparison to determine whether an error message is present on the user interface. In another embodiment, the underlying code of the user interface can be inspected by the testing environment to identify error messages relating to the textual input fields. In another embodiment, telemetry data generated by the software under test can be used to determine that the provided textual input did not result in an error message. For example, upon selecting user interface element 208, without any errors, the software under test may perform an action that is recorded in the testing log that indicates that the provided test was accepted.

Figure 5A:
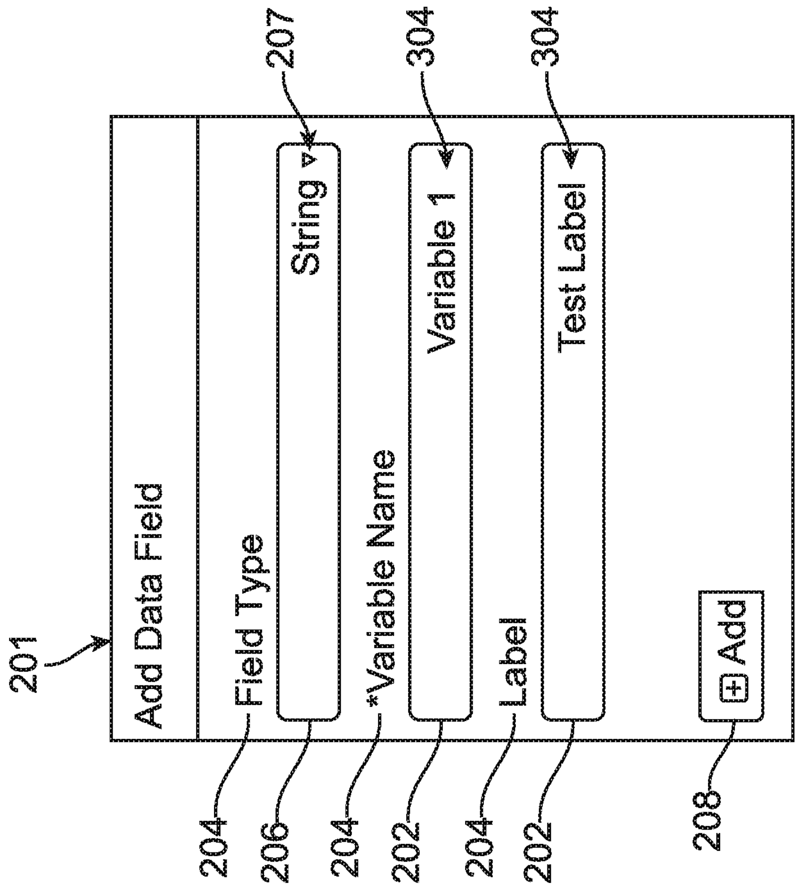
FIGS. 5A, 5B, 5C, and 5D depict examples of a user interface of software under test including input text received from a natural language processing system in accordance with one or more embodiments.

Referring now to FIG. 5A, an example of a user interface 201 of the software under test including input text 304 received from a natural language processing system 301, shown in FIG. 3B, in accordance with one or more embodiments, is shown. As illustrated, the input text 304 received from a natural language processing system 301 is input to the corresponding textual input fields 202. Once the textual input fields 202 have been completed, the user interface element 208 is selected and the user interface form is submitted. Once the user interface element 208 is selected, and the user interface for is submitted, the response of the software is recorded in a testing log, such as the testing log 130 shown in FIG. 1. The recorded response can include, the input text provided for each textual input field, an indication of whether the text was accepted or whether an error message was provided regarding the input text, and information regarding the error message.

In one embodiment, the user interface element 208 is not available to be selected until all the textual input fields 202 have been completed. For example, if a textual input field 202 is left blank, the user interface element 208 may not be available for selection. In another example, if an input text 304 provided for a textual input field 202 is not in a proper format, the user interface element 208 may not be available for selection. In both examples, an error message may be displayed on the user interface 201 that indicates the condition that is preventing the user interface element from be available. For example, the error message may indicate that a user interface element 208 is blank or that the input text 304 for the user interface element 208 is not in the proper format. In one embodiment, the testing environment performs a comparison of the user interface 200 from before and after providing input text into textual input fields of the user interface element. For example, the testing environment may capture an image of the user interface 200 before and after providing input text into textual input fields of the user interface element and calculate a similarity between the two images. Based on the determination that the user interface has changed more than a threshold amount (e.g., the similarity is less than ninety percent), the testing environment detects the changed portions of the user interface. The locations of the changed portions of the user interface are compared with the locations of the textual input fields and changed portions that are proximate to the textual input fields are determined to be error messages relating to the textual input fields. The testing environment uses this comparison to determine whether an error message is present on the user interface. In another embodiment, the underlying code of the user interface can be inspected by the testing environment to identify error messages relating to the textual input fields. In these cases, the testing environment generates a query including the label and information about the error message and provides the query to the natural language processing system. In one embodiment, the query is structured to request that the natural language processing system generate an updated input text based on the label and the information about the error message. The testing environment receives an updated input text from the natural language processing system and input into the textual input field.

Figure 5B:
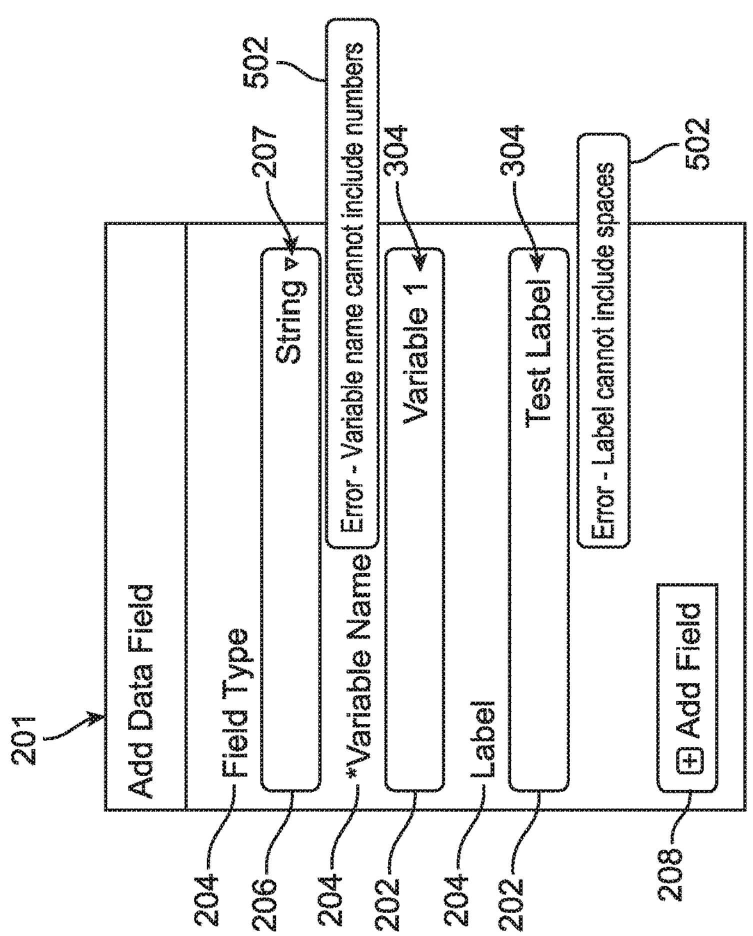

In various embodiments, the textual input fields 202 have specific input rules that the input text 304 must comply with. For example, the textual input field 202 may include restrictions on a length of an input text 304, the characters used in the input text 304, and the format of the input text 304. In one embodiment, as shown in FIG. 5B, one or more error messages 502 relating to textual input fields 202 are displayed by the software under test on the user interface 201. In various embodiments, the error messages 502 may be displayed prior or after the selection of the user interface element.

In one embodiment, the testing environment performs a comparison of the user interface 201 from before selecting the user interface element 208 and after selecting the user interface element is used to identify the presence of an error message is present on the user interface. In one embodiment, a comparison of the user interface 201 from before entering input text 304 into the textual input field 202 and after entering input text 304 into the textual input field 202 is used to identify the presence of an error message is present on the user interface. For example, the testing environment may capture an image of the user interface 200 before selecting the user interface element 208 and after selecting the user interface element and calculates a similarity between the two images. Based on the determination that the user interface has not changed (e.g., that the similarity is above a first threshold level) and that the user interface has is not identical (e.g., that the similarity is less than one hundred percent), the testing environment detects the changed portions of the user interface. The locations of the changed portions of the user interface are compared with the locations of the textual input fields and changed portions that are proximate to the textual input fields are determined to be error messages relating to the textual input fields. The testing environment uses this comparison to determine whether an error message is present on the user interface. In another embodiment, the underlying code of the user interface can be inspected by the testing environment to identify error messages relating to the textual input fields. In further embodiment, telemetry data generated by the software under test can be used to determine that the provided textual input did not result in an error message. For example, upon selecting user interface element 208, without any errors, the software under test may perform an action that is recorded in the testing log that indicates that the provided test was accepted.

In one embodiment, when an input text 304 is provided to the user interface 201 that does not comply with the input rules, an error message 502 that indicates the rule violated by the input text 304 is displayed.

Figure 6A:
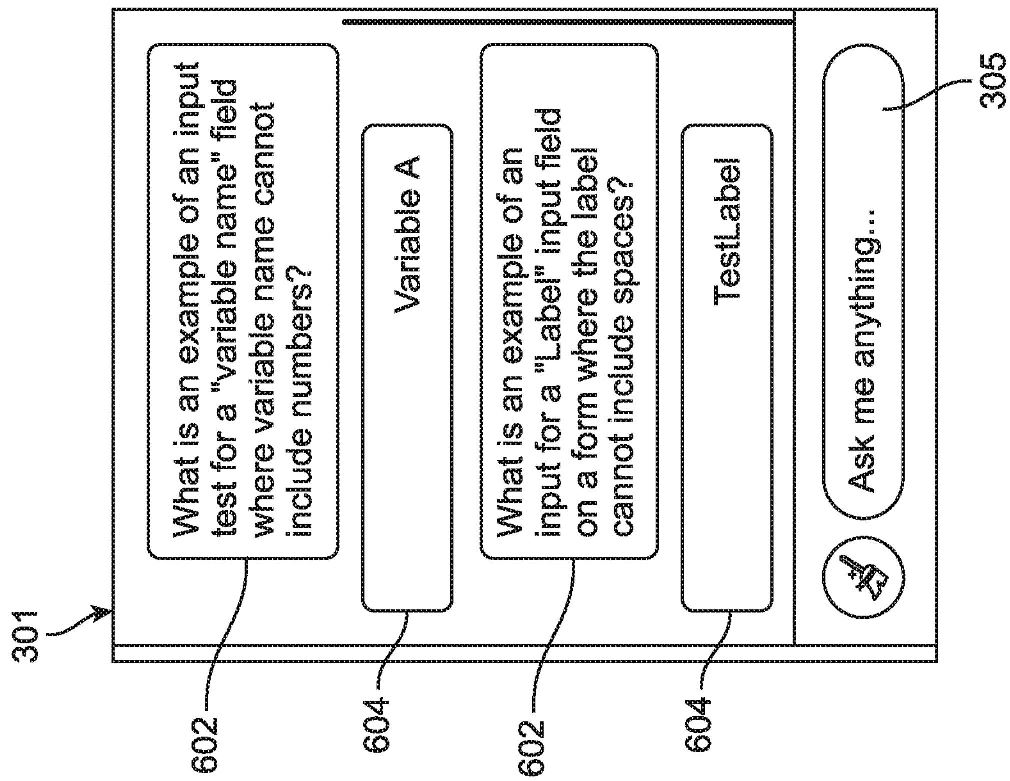
FIGS. 6A and 6B depict examples of a query and response of a natural language processing system for generating input text in accordance with one or more embodiments.

Referring now to FIG. 6A, an example of a query and response of a natural language processing system 301 for generating updated input text in accordance with one or more embodiments is shown. The query and response of the natural language processing system 301 shown in FIG. 6A corresponds to the user interface 201 depicted in FIG. 5B. In one embodiment, queries 602 including the labels 204 and information about the error messages 502 of one or more textual input fields 202 are provided to natural language processing system 301. For example, the queries 602 may be structured as "Please provide a sample input for a textual input field having a label [label 204]?" In another embodiment, the query only includes the labels 204 of the textual input fields 202. The natural language processing system 301 generates a response to each query 302. The generated response includes an updated input text 604.

Figure 5C:
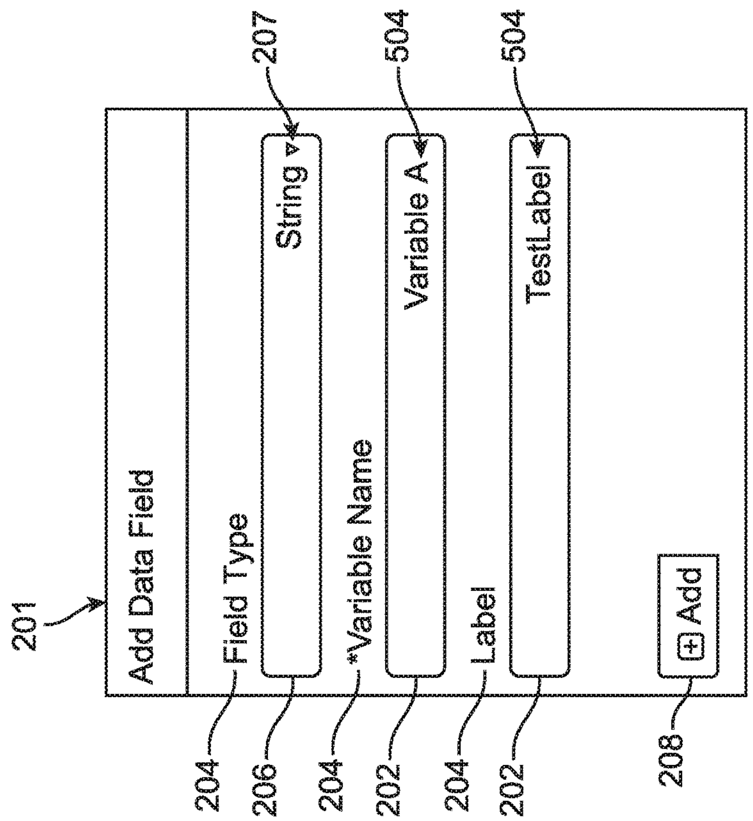
Figure 5D:
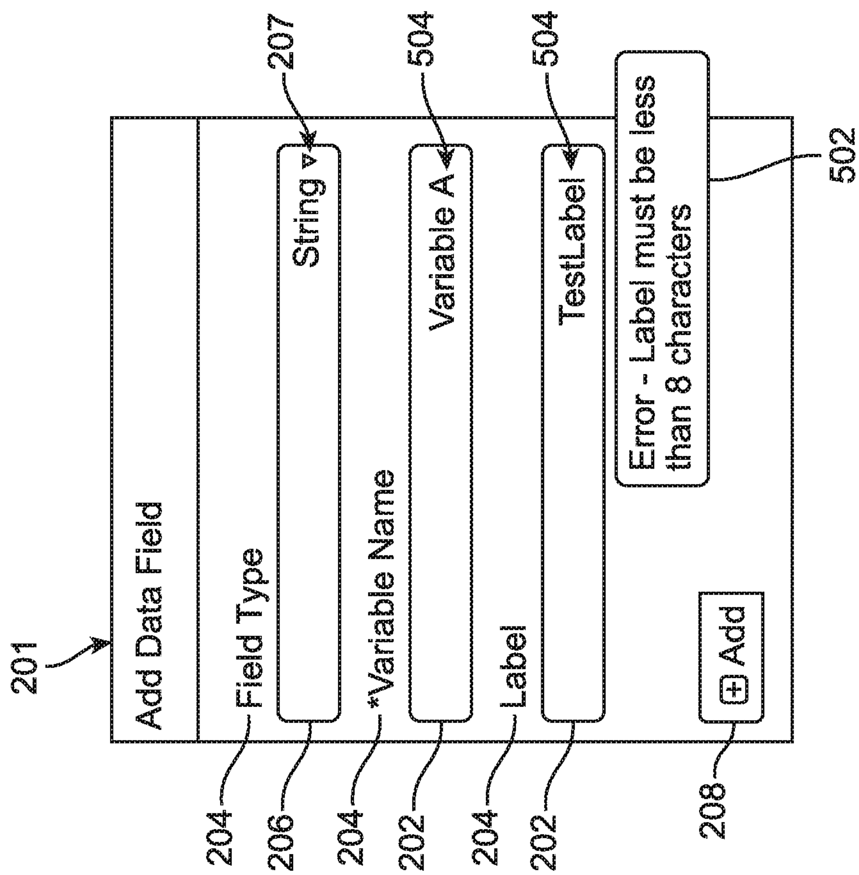

Referring now to FIG. 5C, an example of a user interface 201 of the software under test including updated input text received from a natural language processing system 301, shown in FIG. 6A, in accordance with one or more embodiments, is shown. As illustrated, the updated input text 504 received from a natural language processing system 301 is input to the corresponding textual input fields 202. In one embodiment, once the textual input fields 202 have been completed, the user interface element 208 is selected and the user interface form is submitted. In one embodiment, as shown in FIG. 5D, an error message 502 relating to textual input fields 202 is displayed by the software under test on the user interface 201. In one embodiment, the error message 502 relating to textual input fields 202 is displayed by the software under test on the user interface 201 in response to the selection of the user interface element 208. In another embodiment, the error message 502 relating to textual input fields 202 is displayed by the software under test on the user interface 201 prior to the selection of the user interface element 208.

Figure 6B:
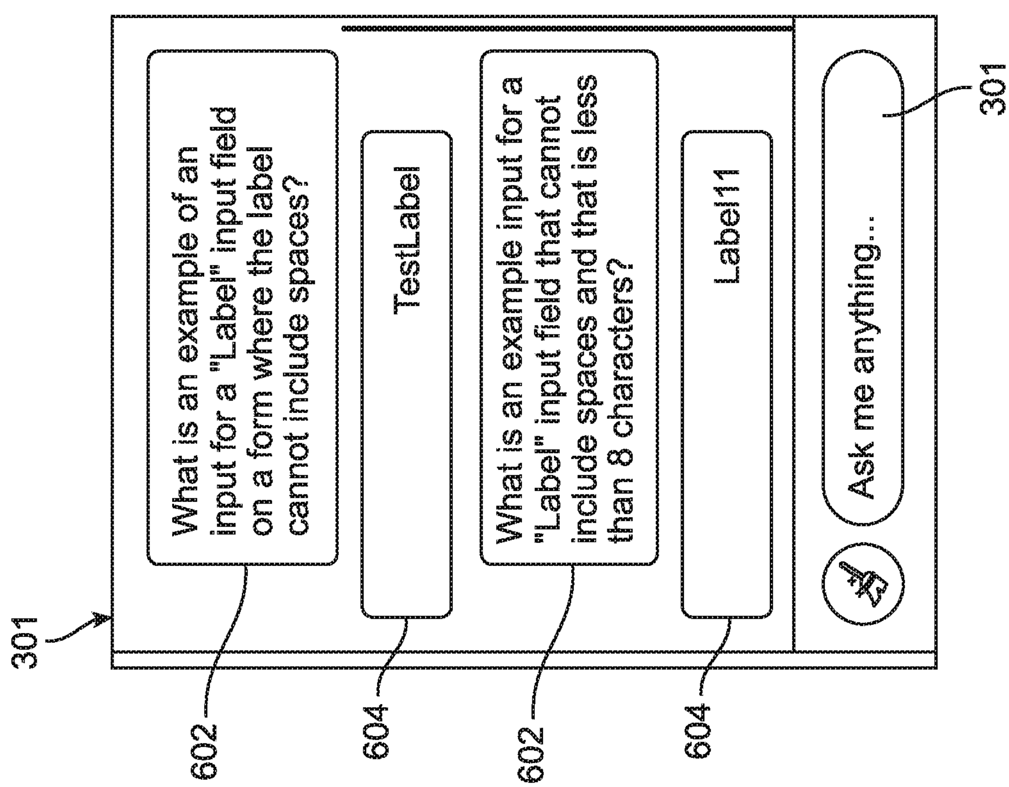

Referring now to FIG. 6B, an example of a query and response of a natural language processing system 301 for generating updated input text in accordance with one or more embodiments is shown. The query and response of the natural language processing system 301 shown in FIG. 6B corresponds to the user interface 201 depicted in FIG. 5D. In one embodiment, queries 602 including the labels 204 and information about the error messages 502 of one or more textual input fields 202 are provided to natural language processing system 301. The natural language processing system 301 generates a response to each query 602. The generated response includes an updated input text 604.

Referring now to FIG. 7, an example of a textual input database 700 in accordance with one or more embodiments is shown. As illustrated, the textual input database 700 includes a plurality of entries 702. In one embodiment, each entry 702 includes an identification of the software under test 704, an input field label 706, and an accepted input text 708. The identification of the software under test 704 includes an identification of the software under test that corresponds to the input field label 706 and the accepted input text 708. In one embodiment, the accepted input text 708 may store more than one value that has previously been accepted by the software under test. In one embodiment, the textual input database 700 is updated to add newly accepted input text 708 identified during testing of the identified software under test 704 for the corresponding input field label 706. For example, add or update record commands may be used to respectively add the accepted input text 708 to update an existing record of the textual input database 700 for the corresponding input field label 706. In addition, the textual input database 700 may be updated to remove any previously accepted input text 708 that results in an error during testing of the software under test. For example, an update record command may be used to update an existing record of the textual input database 700 to remove an input text corresponding input field label 706 that resulted in an error message.

Figure 8:
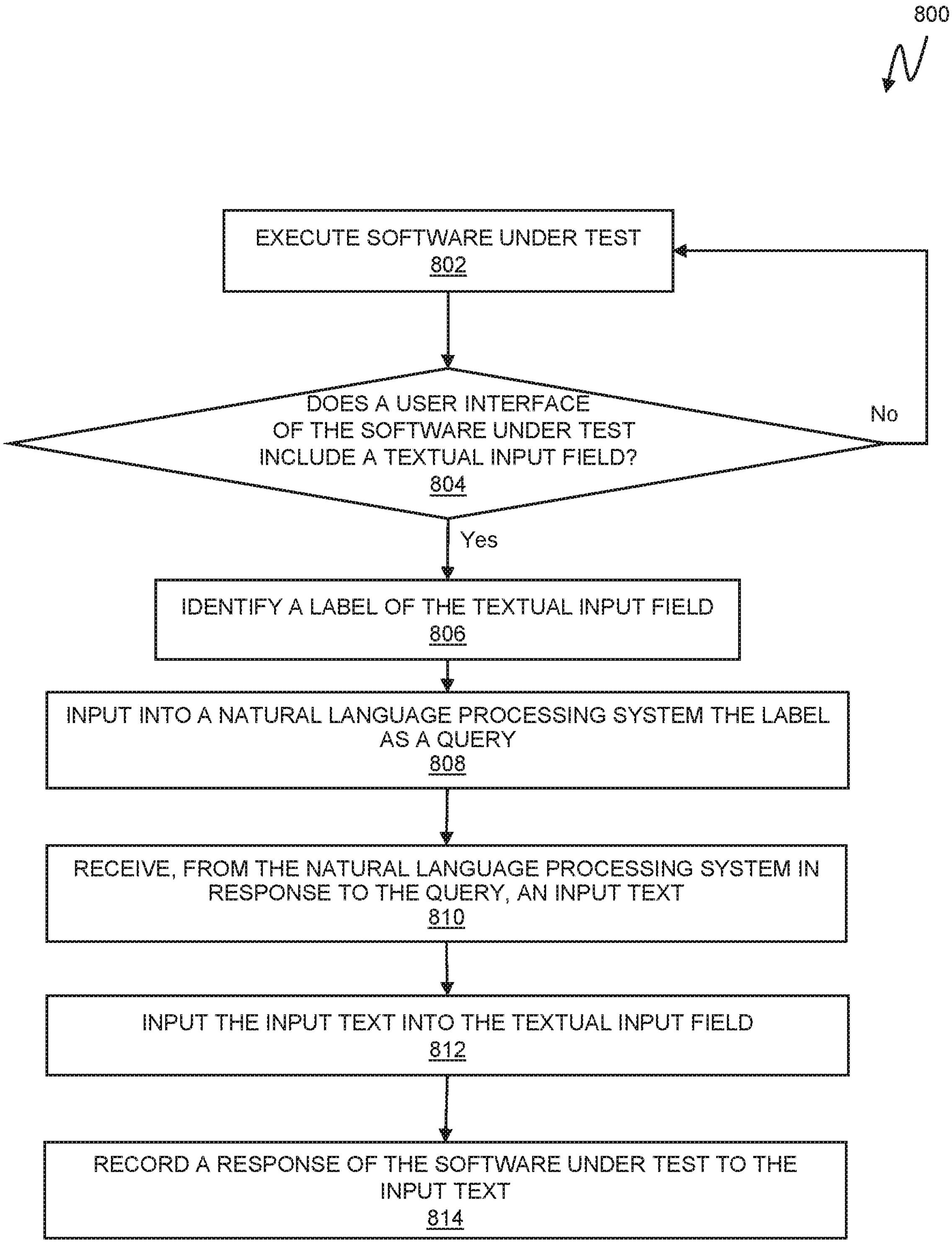
FIG. 8 depicts a flowchart of an example method for automated software testing in accordance with one or more embodiments.

Referring now to FIG. 8, a flowchart of a method 800 for automated software testing in accordance with one or more embodiments is shown. The method 800 is described with reference to FIGS. 1 to 7 and may include additional steps not depicted in FIG. 8. Although depicted in a particular order, the blocks depicted in FIG. 8 can be, in some embodiments, rearranged, subdivided, and/or combined.

At block 802, the method 800 includes executing the software under test. The software can include an operating system, application software, web-based software, and the like. In general, the software may be any type of software or application that has a user interface that includes a textual input field.

At decision block 804, the method 800 also includes determining whether the user interface includes a textual input field. Based on a determination that the user interface of the software includes a textual input field, the method 800 proceeds to block 806 and identifies a label of the textual input field. In one embodiment, the label of the textual input field is identified based at least in part on its location relative to the textual input field. In one example, the label is identified based on the relative placement of the label and the textual input field. For example, the label can be identified as the text located closest to the textual input field. In another example, determining the label of a textual input field can include obtaining the relationship between the textual input fields and labels from an accessibility markup of the software or based on identifying a similarity between the names of the textual input fields and labels (e.g., "Label_1", "Input_1").

At block 808, the method 800 includes inputting the label into a natural language processing system as a query. In one embodiment, the query is input into the natural language processing system via an application programming interface (API) of the natural language processing system. In another embodiment, the query is input into an input field of a user interface of the natural language processing system.

At block 810, the method 800 includes receiving, from the natural language processing system in response to the query, an input text. In one embodiment, the response from the query is received via the API of the natural language processing system. In another embodiment, the response from the query is obtained from the user interface of the natural language processing system.

At block 812, the method 800 includes inputting the input text into the textual input field of the user interface. The method 800 concludes at block 814 by recording a response of the software to the input text. For example, the response of the software may be stored in a testing log, such as the testing log 130, shown in FIG. 1. In one embodiment, the response of the software includes the input text being accepted by the software. In this case, the input text, the label of the textual input field, and an identification of the software are stored in the testing log. In another embodiment, the response of the software includes providing an error message related to a textual input field. In this case, the input text, the label of the textual input field, an identification of the software, and information about the error message are stored in the testing log. In these embodiments, the method 800 further includes inputting into the natural language processing system the label and information about the error message as a second query, receiving, from the natural language processing system in response to the second query, a second input text, and inputting the second input text into the textual input field.

In another embodiment, the response of the software includes displaying an updated user interface that does not include an error message. In this embodiment, the input text and the label associated with the textual input field may be stored in a textual input database.

In a further embodiment, the response of the software includes performing an action and creating an event in a testing log that indicates the action was performed. In this embodiment, the input text and the label associated with the textual input field may be stored in a textual input database.

Figure 9:
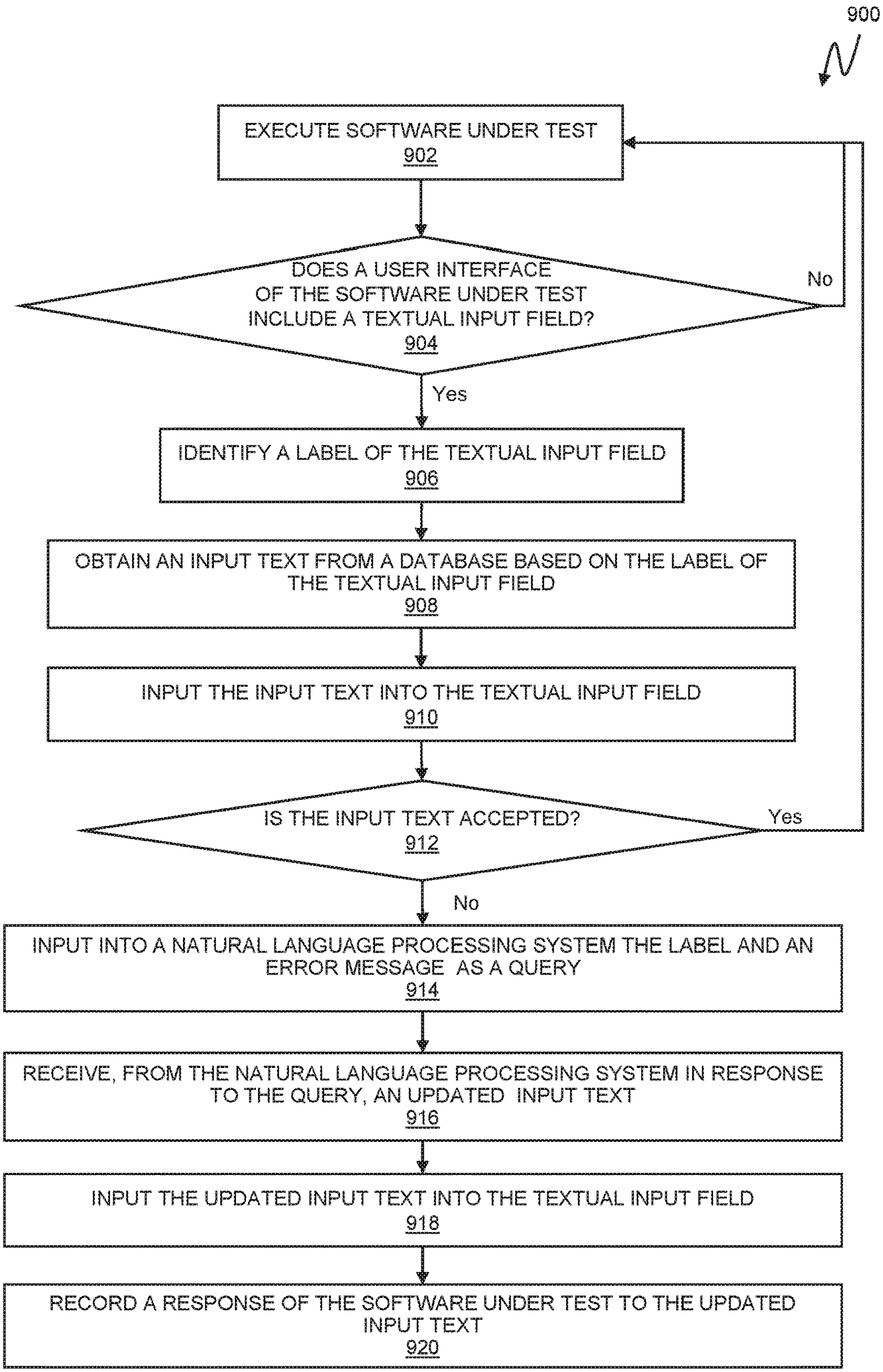
FIG. 9 depicts a flowchart of another example method for automated software testing in accordance with one or more embodiments.

Referring now to FIG. 9, a flowchart of a method 900 for automated software testing in accordance with one or more embodiments is shown. The method 900 is described with reference to FIGS. 1 to 7 and may include additional steps not depicted in FIG. 9. Although depicted in a particular order, the blocks depicted in FIG. 9 can be, in some embodiments, rearranged, subdivided, and/or combined.

At block 902, the method 900 includes executing the software under test. The software can include an operating system, application software, web-based software, and the like. In general, the software may be any type of software or application that has a user interface that includes a textual input field.

At decision block 904, the method 900 also includes determining whether the user interface includes a textual input field. Based on a determination that the user interface of the software includes a textual input field, the method 900 proceeds to block 906 and identifies a label of the textual input field. In one embodiment, the label of the textual input field is identified based at least in part on its location relative to the textual input field. In one example, the label is identified as the text located closest to the textual input field.

At block 908, the method 900 includes obtaining an input text from a textual input database based on the label of the textual input field. In one embodiment, obtaining the input text from the textual input database includes querying the textual input database based on the label of the textual input field and optionally an identification of the software. In one embodiment, if the textual input database does not include an input text associated with the label, the method 900 proceeds to block 916.

At block 910, the method 900 includes inputting the input text received from the textual input database into the textual input field of the user interface. Next, as shown at decision block 912, the method 900 includes determining whether the input text was accepted by the software. In one embodiment, a determination that the input text was not accepted by the software is made based on the software providing an error message related to the textual input field. In one embodiment, a determination that the input text was accepted by the software is made based on determining that the software did not provide an error message related to the textual input field. In another embodiment, a determination that the input text was accepted by the software is made based on identifying an action in a testing log of the software.

At block 914, the method 900 includes inputting into a natural language processing system the label and information about the error message as a query. In one embodiment, the query is input into the natural language processing system via an API of the natural language processing system. In another embodiment, the query is input into an input field of a user interface of the natural language processing system.

At block 916, the method 900 includes receiving, from the natural language processing system in response to the query, an updated input text. In one embodiment, the response from the query is received via the API of the natural language processing system. In another embodiment, the response from the query is obtained from the user interface of the natural language processing system.

At block 918, the method 900 includes inputting the updated input text into the textual input field of the user interface. The method 900 concludes at block 920 by recording a response of the software to the updated input text. For example, the response of the software may be stored in a testing log, such as the testing log 130, shown in FIG. 1. In one embodiment, the response of the software includes the input text being accepted by the software. In this case, the input text, the label of the textual input field, and an identification of the software are stored in the testing log. In another embodiment, the response of the software includes providing a second error message related to a textual input field. In this case, the input text, the label of the textual input field, an identification of the software, and information about the second error message are stored in the testing log. In these embodiments, the method 900 further includes inputting into the natural language processing system the label and the second error message as a second query, receiving, from the natural language processing system in response to the second query, a second input text, and inputting the second input text into the textual input field.

In another embodiment, the response of the software includes displaying an updated user interface that does not include an error message. In this embodiment, the input text and the label associated with the textual input field may be stored in a textual input database.

In a further embodiment, the response of the software includes performing an action and creating an event in a testing log that indicates the action was performed. In this embodiment, the input text and the label associated with the textual input field may be stored in a textual input database.

Figure 10:
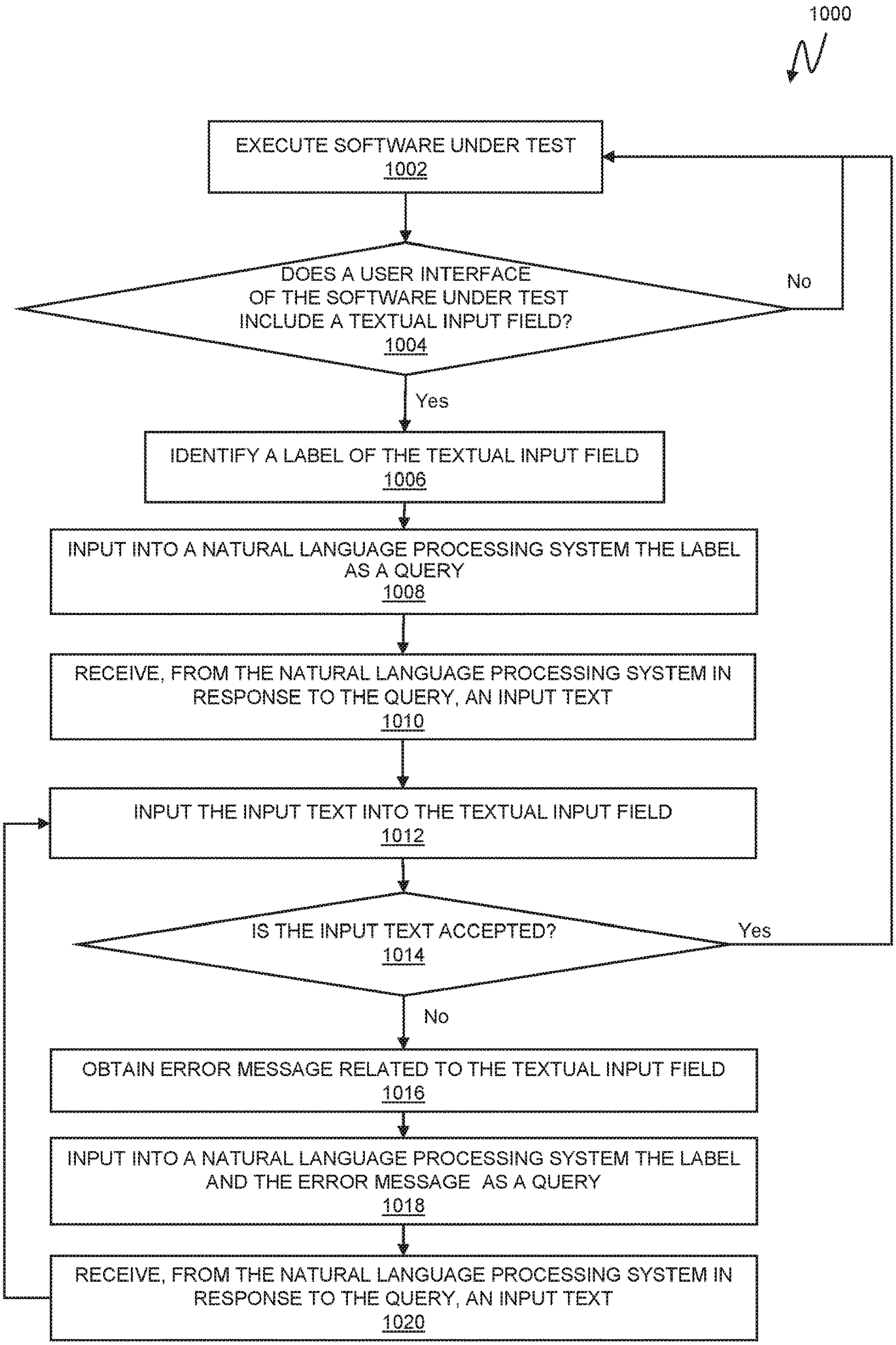
FIG. 10 depicts a flowchart of a further example method for automated software testing in accordance with one or more embodiments.

Referring now to FIG. 10, a flowchart of a method 1000 for automated software testing in accordance with one or more embodiments is shown. The method 1000 is described with reference to FIGS. 1 to 7 and may include additional steps not depicted in FIG. 10. Although depicted in a particular order, the blocks depicted in FIG. 10 can be, in some embodiments, rearranged, subdivided, and/or combined.

At block 1002, the method 1000 includes executing the software under test. The software can include an operating system, application software, web-based software, and the like. In general, the software may be any type of software or application that has a user interface that includes a textual input field.

At decision block 1004, the method 1000 also includes determining whether the user interface includes a textual input field, as shown. Based on a determination that the user interface of the software includes a textual input field, the method 1000 proceeds to block 1006 and identifies a label of the textual input field. In one embodiment, the label of the textual input field is identified based at least in part on its location relative to the textual input field. In one example, the label is identified as the text located closest to the textual input field.

At block 1008, the method 1000 includes inputting into a natural language processing system the label as a query. In one embodiment, the query is input into the natural language processing system via an API of the natural language processing system. In another embodiment, the query is input into an input field of a user interface of the natural language processing system.

At block 1010, the method 1000 includes receiving, from the natural language processing system in response to the query, an input text. In one embodiment, the response from the query is received via the API of the natural language processing system. In another embodiment, the response from the query is obtained from the user interface of the natural language processing system.

At block 1012, the method 1000 includes inputting the input text into the textual input field of the user interface. Next, as shown at decision block 1014, the method 1000 includes determining whether the input text was accepted by the software. In one embodiment, a determination that the input text was not accepted by the software is made based on the software providing an error message related to the textual input field. In one embodiment, a determination that the input text was accepted by the software is made based on determining that the software did not provide an error message related to the textual input field. In another embodiment, a determination that the input text was accepted by the software is made based on identifying an action in a testing log of the software.

At block 1016, the method 1000 includes obtaining an error message related to the textual input field from the user interface of the software. In one embodiment, an error message displayed on the user interface of the software is determined to be related to a textual input field of the user interface based on the proximity of the error message to the textual input field. In another embodiment, an error message displayed on the user interface of the software is determined to be related to a textual input field of the user interface based on the error message containing the label associated with the textual input field.

At block 1018, the method 1000 includes input into a natural language processing system the label and information about the error message as a query. In one embodiment, the query is input into the natural language processing system via an API of the natural language processing system. In another embodiment, the query is input into an input field of a user interface of the natural language processing system.

At block 1020, the method 1000 includes receiving, from the natural language processing system in response to the query, an input text. In one embodiment, the response from the query is received via the API of the natural language processing system. In another embodiment, the response from the query is obtained from the user interface of the natural language processing system.

The method 1000 returns to block 1012 and inputs the text into the textual input field of the user interface. In one embodiment, the method 1000 continues to repeat the steps shown in blocks 1012, 1014, 1016, 1018, and 1020 until a determination is made at decision block 1014 that the input text is accepted by the software.

In another embodiment, the method 1000 is configured to execute a maximum number of iterations of the steps shown in blocks 1012, 1014, 1016, 1018, and 1020. Based on a determination that the maximum number of iterations has been reached without the input text being accepted, the method 1000 concludes by generating an error notification that is transmitted to a user. In another embodiment, on a determination that the maximum number of iterations has been reached without the input text being accepted, the method 1000 concludes by creating an entry in the testing log, the entry can include the label of the textual input field, the input texts attempted, and the error messages received.

In a further embodiment, the method 1000 continues to repeat the steps shown in blocks 1012, 1014, 1016, 1018, and 1020 until a determination is made at decision block 1014 that the input text is accepted by the software, or a determination is made that consecutive error messages provided by the software for the textual input field are identical. In one embodiment, the testing environment compares error messages obtained from the software relating to a textual input field to previously obtained from the software relating to the textual input field to determine a similarity of the error messages. In one embodiment, based on a determination that consecutive error messages provided by the software for the textual input field are identical, the method 1000 concludes by generating an error notification that is transmitted to a user. In one embodiment, based on a determination that consecutive error messages provided by the software for the textual input field are identical, the method 1000 concludes by creating an entry in the testing log, the entry can include the label of the textual input field, the input texts attempted, and the error messages received.

In a further embodiment, the method 1000 continues to repeat the steps shown in blocks 1012, 1014, 1016, 1018, and 1020 until a determination is made at decision block 1014 that the input text is accepted by the software or a determination is made that an error message provided by the software for the textual input field is identical to a previously received error message for the same textual input field. Based on a determination that a duplicate error message has been provided by the software for same the textual input field, the method 1000 concludes by generating an error notification that is transmitted to a user.

Figure 11:
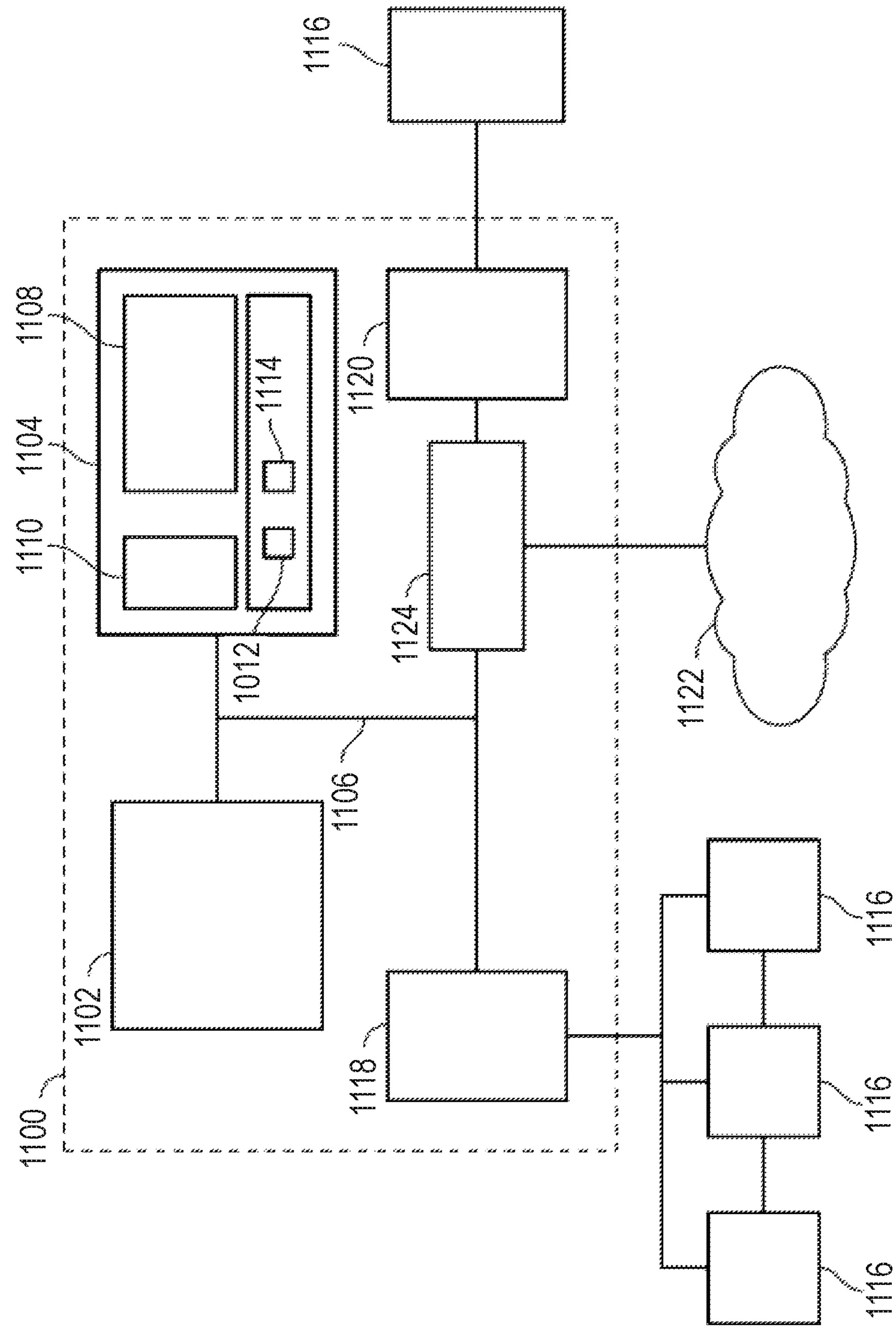
FIG. 11 depicts a block diagram of an example computer system according to one or more embodiments.

FIG. 11 illustrates aspects of an embodiment of a computer system 1100 that can perform various aspects of embodiments described herein. In some embodiments, the computer system(s) 1100 can implement and/or otherwise be incorporated within or in combination with any of the methods 800, 900, and 1000 described previously herein. In some embodiments, a computer system 1100 can be configured to carry out the functionality of the testing environment 110. In some embodiments, a computer system 1100 can be configured to carry out the functionality of the natural language processing system 120.

The computer system 1100 includes at least one processing device 1102, which generally includes one or more processors or processing units for performing a variety of functions, such as, for example, completing any portion of the methods 800, 900, and 1000 described previously herein. Components of the computer system 1100 also include a system memory 1104, and a bus 1106 that couples various system components including the system memory 1104 to the processing device 1102. The system memory 1104 may include a variety of computer system readable media. Such media can be any available media that is accessible by the processing device 1102, and includes both volatile and non-volatile media, and removable and non-removable media. For example, the system memory 1104 includes a non-volatile memory 1108 such as a hard drive, and may also include a volatile memory 1110, such as random-access memory (RAM) and/or cache memory. The computer system 1100 can further include other removable/non-removable, volatile/non-volatile computer system storage media.

The system memory 1104 can include at least one program product having a set (e.g., at least one) of program modules that are configured to carry out functions of the embodiments described herein. For example, the system memory 1104 stores various program modules that generally carry out the functions and/or methodologies of embodiments described herein. A module or modules 1112, 1114 may be included to perform functions related to the methods 800, 900, and 1000 as described previously herein. The computer system 1100 is not so limited, as other modules may be included depending on the desired functionality of the computer system 1100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 1102 can also be configured to communicate with one or more external devices 1116 such as, for example, a keyboard, a pointing device, and/or any devices (e.g., a network card, a modem) that enable the processing device 1102 to communicate with one or more other computing devices. Communication with various devices can occur via Input/Output (I/O) interfaces 1118 and 1120.

The processing device 1102 may also communicate with one or more networks 1122 such as a local area network (LAN), a general wide area network (WAN), a bus network and/or a public network (e.g., the Internet) via a network adapter 1124. In some embodiments, the network adapter 1124 is or includes an optical network adaptor for communication over an optical network. It should be understood that although not shown, other hardware and/or software components may be used in conjunction with the computer system 1100. Examples include microcode, device drivers, redundant processing units, external disk drive arrays, RAID systems, and data archival storage systems.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the disclosure are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

For the sake of brevity, conventional techniques related to making and using aspects of the disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method for automated software testing, the method comprising:

executing software under test;

determining that a user interface of the software includes a textual input field;

identifying a label of the textual input field;

identifying additional information regarding the textual input field, the additional information comprising hover-over text that is displayed when a cursor is over the textual input field;

inputting into a natural language processing system a query comprising the label, the additional information, and an instruction to generate a sample input for the textual input field;

receiving, from the natural language processing system in response to the query, a first input text comprising the sample input;

inputting the first input text into the textual input field;

recording a first response of the software to the first input text;

determining that the first response of the software includes a first error message related to the first input text entered in the textual input field, the first error message comprising a constraint for the textual input field;

inputting into the natural language processing system an updated query comprising the label, the additional information, and an instruction to generate a second sample input for the textual input field subject to the constraint;

receiving, from the natural language processing system in response to the updated query, a second input text comprising the second sample input;

inputting the second input text into the textual input field; and recording a second response of the software to the second input text.

2. The method of claim 1, further comprising:

determining that the first response of the software does not include an error message related to the textual input field; and storing the label associated with the textual input field and the first input text in one or more of a testing log associated with the software and a textual input database.

3. The method of claim 1, wherein the determination that the first response of the software includes the first error message is based on a comparison of the user interface before the inputting the first input text into the textual input field and after inputting the first input text into the textual input field.

4. The method of claim 1, further comprising:

determining that the second response of the software does not include a second error message related to the textual input field; and storing the label associated with the textual input field and the second input text in one or more of a testing log associated with the software and a textual input database.

5. The method of claim 1, wherein the second response of the software to the second input text includes a second error message related to the textual input field.

6. The method of claim 5, further comprising:

determining that the first error message and the second error message are different;

inputting, into the natural language processing system the label, the first error message, and information about the second error message as a third query;

receiving, from the natural language processing system in response to the third query, a third input text;

inputting the third input text into the textual input field; and recording a third response of the software to the third input text.

7. The method of claim 6, further comprising:

determining that the first error message and the second error message are identical; and transmitting an error notification.

8. The method of claim 6, wherein the third response of the software includes a third error message related to the textual input field, and the method further comprises transmitting an error notification.

9. The method of claim 1, wherein the natural language processing system is a large language model.

10. A method for automated software testing, the method comprising:

executing software under test;

determining that a user interface of the software includes a textual input field;

identifying a label of the textual input field;

identifying additional information regarding the textual input field, the additional information comprising hover-over text that is displayed when a cursor is over the textual input field;

obtaining a first input text from a textual input database based on the label;

inputting the first input text into the textual input field;

determining that a first response of the software to the first input text includes a first error message related to the textual input field, the first error message comprising a constraint for the textual input field;

inputting into a natural language processing system the label, information about the first error message, and the additional information as a query that includes an instruction to generate a second sample input for the textual input field subject to the constraint;

receiving, from the natural language processing system in response to the query, a second input text comprising the second sample input;

inputting the second input text into the textual input field; and recording a second response of the software to the second input text.

11. The method of claim 10, further comprising:

determining that the second response of the software does not include an error message related to the textual input field; and updating the textual input database to include the second input text.

12. The method of claim 10, wherein the second response of the software to the second input text includes a second error message related to the textual input field.

13. The method of claim 12, further comprising:

inputting, into the natural language processing system the label, the first error message, and information about the second error message as a second query;

receiving, from the natural language processing system in response to the second query, a third input text;

inputting the third input text into the textual input field; and recording a third response of the software to the third input text.

14. The method of claim 13, wherein the third response of the software includes a third error message related to the textual input field, the method further comprises comparing the third error message to one or more of the first error message and the second error message.

15. The method of claim 14, further comprising:

determining that the third error message is identical to one or more of the first error message and the second error message; and transmitting an error notification to a user.

16. A system having a memory, computer readable instructions, and a processing system for executing the computer readable instructions, the computer readable instructions control the processing system to perform operations comprising:

executing software under test;

determining that a user interface of the software includes a textual input field;

identifying a label of the textual input field;

identifying additional information regarding the textual input field, the additional information comprising hover-over text that is displayed when a cursor is over the textual input field;

inputting into a natural language processing system the label and the additional information as a first query, the first query including an instruction to generate a sample input for the textual input field;

receiving, from the natural language processing system in response to the first query, a first input text comprising the sample input;

inputting the first input text into the textual input field;

determining that a first response of the software includes a first error message related to the textual input field, the first error message comprising a constraint for the textual input field;

inputting into the natural language processing system the label and information about the first error message as a second query, the second query including an instruction to generate a second sample input for the textual input field subject to the constraint;

receiving, from the natural language processing system in response to the second query, a second input text comprising the second sample input;

inputting the second input text into the textual input field; and recording a second response of the software to the second input text.

17. The system of claim 16, wherein the operations further comprise:

determining that the second response of the software includes a second error message related to the textual input field; and comparing the first error message to the second error message.

* * * * *